(12) United States Patent
Tseng

(10) Patent No.: US 11,281,922 B2
(45) Date of Patent: Mar. 22, 2022

(54) FACE RECOGNITION SYSTEM, METHOD FOR ESTABLISHING DATA OF FACE RECOGNITION, AND FACE RECOGNIZING METHOD THEREOF

(71) Applicant: PEGATRON CORPORATION, Taipei (TW)

(72) Inventor: Yu-Hung Tseng, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/930,739

(22) Filed: May 13, 2020

(65) Prior Publication Data

US 2020/0364479 A1 Nov. 19, 2020

(30) Foreign Application Priority Data

May 13, 2019 (TW) .................... 108116457

(51) Int. Cl.
*G06K 9/00* (2006.01)

(52) U.S. Cl.
CPC ..... *G06K 9/00926* (2013.01); *G06K 9/00281* (2013.01); *G06K 9/00295* (2013.01)

(58) Field of Classification Search
CPC ........... G06K 9/00926; G06K 9/00295; G06K 9/00281; G06K 9/6256; G06K 9/6215; G06K 9/00288; G06K 9/00268; G06K 9/6277; G06K 9/00255; G06K 2009/00932; G06K 9/00026; G06K 9/6255; G06K 9/00892; G06K 9/00979; G06K 9/627; G06K 2009/00738; G06K 9/00006; G06K 9/00617; G06K 9/00711; G06K 9/00771;
(Continued)

(56) References Cited

U.S. PATENT DOCUMENTS

| | | | |
|---|---|---|---|
| 2007/0122005 A1* | 5/2007 | Kage .................. | G06K 9/00275 382/115 |
| 2008/0112621 A1* | 5/2008 | Gallagher .......... | G06K 9/00288 382/190 |

(Continued)

FOREIGN PATENT DOCUMENTS

| | | |
|---|---|---|
| TW | 200739432 A | 10/2007 |
| TW | I415011 B | 11/2013 |
| TW | 201917636 A | 5/2019 |

*Primary Examiner* — Nimesh Patel
(74) *Attorney, Agent, or Firm* — Muncy, Geissler, Olds & Lowe, PC

(57) ABSTRACT

A face recognition system, a method for establishing data of face recognition, and a face recognizing method thereof are disclosed. The face recognition system includes an image obtaining device, a facial analysis module, and a feature comparison module. The image obtaining device is used to obtain a registered facial image. The facial analysis module is used to analyze the registered facial image to obtain a registered facial feature, so as to determine a feature threshold of the registered facial feature. The feature comparison module is used to compare the registered facial feature with a facial feature of a plural facial images to register a facial feature of a similar facial image corresponding to more than a similarity threshold as a false-positive facial image feature. Such that the facial analysis module determines a false-positive threshold of the false-positive facial image feature.

11 Claims, 5 Drawing Sheets

(58) Field of Classification Search
CPC ........... G06K 9/00087; G06K 9/00335; G06K
9/00369; G06K 9/00718; G06K 9/3233;
G06K 9/6218; G06K 9/6262; G06F
21/32; G06F 21/31; G06F 21/6245; G06F
2221/2113; G06F 2221/2149; G06F
21/606; H04L 12/282; H04L 63/0853;
H04L 63/0861; H04L 41/28; H04L 63/00;
H04L 63/0407; H04L 9/3231; H04L
2463/082; H04L 63/105; H04L 63/107;
H04W 12/06; H04W 12/68; H04W
12/068; H04W 12/80; H04W 4/02
See application file for complete search history.

(56) References Cited

U.S. PATENT DOCUMENTS

| | | | |
|---|---|---|---|
| 2008/0137918 A1* | 6/2008 | Eura | G06K 9/6255 |
| | | | 382/118 |
| 2010/0316265 A1* | 12/2010 | Nakanowatari | G06K 9/00288 |
| | | | 382/118 |
| 2010/0332648 A1* | 12/2010 | Bohus | G06Q 10/10 |
| | | | 709/224 |
| 2011/0194732 A1* | 8/2011 | Tsuji | G06K 9/00288 |
| | | | 382/103 |
| 2017/0140212 A1* | 5/2017 | Lo | G06K 9/6206 |
| 2018/0189551 A1 | 7/2018 | Ranganath et al. | |
| 2020/0082062 A1* | 3/2020 | Mequanint | G06F 21/32 |

* cited by examiner

FACE RECOGNITION SYSTEM, METHOD FOR ESTABLISHING DATA OF FACE RECOGNITION, AND FACE RECOGNIZING METHOD THEREOF

BACKGROUND

1. Technology Field

The present disclosure relates to a face recognition system, a method for establishing data of face recognition and a face recognizing method thereof, particularly to a face recognition system, a method for establishing data of face recognition, and a face recognizing method thereof capable of identifying false-positive facial images.

2. Description of the Related Art

With the advancement of science and technology, many face recognition technologies appeared, such as real-time recognition for access control or surveillance images. However, it is still difficult to identify similar faces. Taking FIG. 1 as an example, FIG. 1 is a schematic diagram of similar face comparison in the prior art, which shows a first facial image 91 and a second facial image 92. The first facial image 91 and the second facial image 92 have similar looks. The face recognition technology in t he prior art is likely to identify similar faces as the same person.

Accordingly, it is necessary to devise a new face recognition system, a method for establishing data of face recognition and a face recognizing method thereof to solve the problem in the prior art.

SUMMARY DISCLOSURE

It is a major objective of the present disclosure to provide a face recognition system having the effect of identifying false-positive facial images.

It is another objective of the present disclosure to provide a method for establishing data of face recognition used for the above structure.

It is further objective of the present disclosure to provide a face recognizing method using the above approach.

To achieve the above objectives, a face recognition system of the present disclosure includes an image obtaining device, a facial analysis module, a first database, and a feature comparison module. The image obtaining device is used to obtain a registered facial image. The facial analysis module is electrically connected to the image obtaining device for analyzing the registered facial image to obtain a registered facial feature and set a feature threshold for the registered facial feature. The first database is used to store a plurality of facial images. The feature comparison module is electrically connected to the first database for comparing the registered facial features with the facial feature of the plural facial images stored in the first database to register a facial feature of a similar facial image corresponding to more than a similarity threshold as a false-positive facial image feature. Also, the facial analysis module determines a false-positive threshold of the false-positive facial image feature.

A method for establishing data of face recognition in the present disclosure includes the following steps: obtaining a registered facial image;
analyzing the registered facial image to obtain a registered facial feature; comparing the registered facial feature with facial features of plurality facial images stored in a first database to obtain a similar facial image that exceeds a similarity threshold; registering a facial feature of the similar facial image as a false-positive facial image feature; setting a false-positive threshold of the false-positive facial image feature; and setting a feature threshold of the registered facial feature.

A face recognizing method in the present disclosure includes the following steps: obtaining a captured image; performing image processing to find a captured facial image; obtaining a captured facial feature by analyzing the captured facial image; comparing the captured facial feature with the registered facial feature to obtain a first similarity; determining whether the first similarity is greater than or equal to a feature threshold; if the first similarity is less than the feature threshold, it is identified as an unregistered person; if the first similarity is greater than or equal to the feature threshold, comparing the captured facial feature and a false-positive facial image feature to obtain a second similarity; determining whether the second similarity is less than the false-positive threshold; and if the second similarity is less than the false-positive threshold, identifying the captured image as a registered person.

DETAILED DESCRIPTION OF THE PREFERRED EMBODIMENTS

Hereafter, the technical content of the present invention will be better understood with reference to preferred embodiments.

Figure 1:
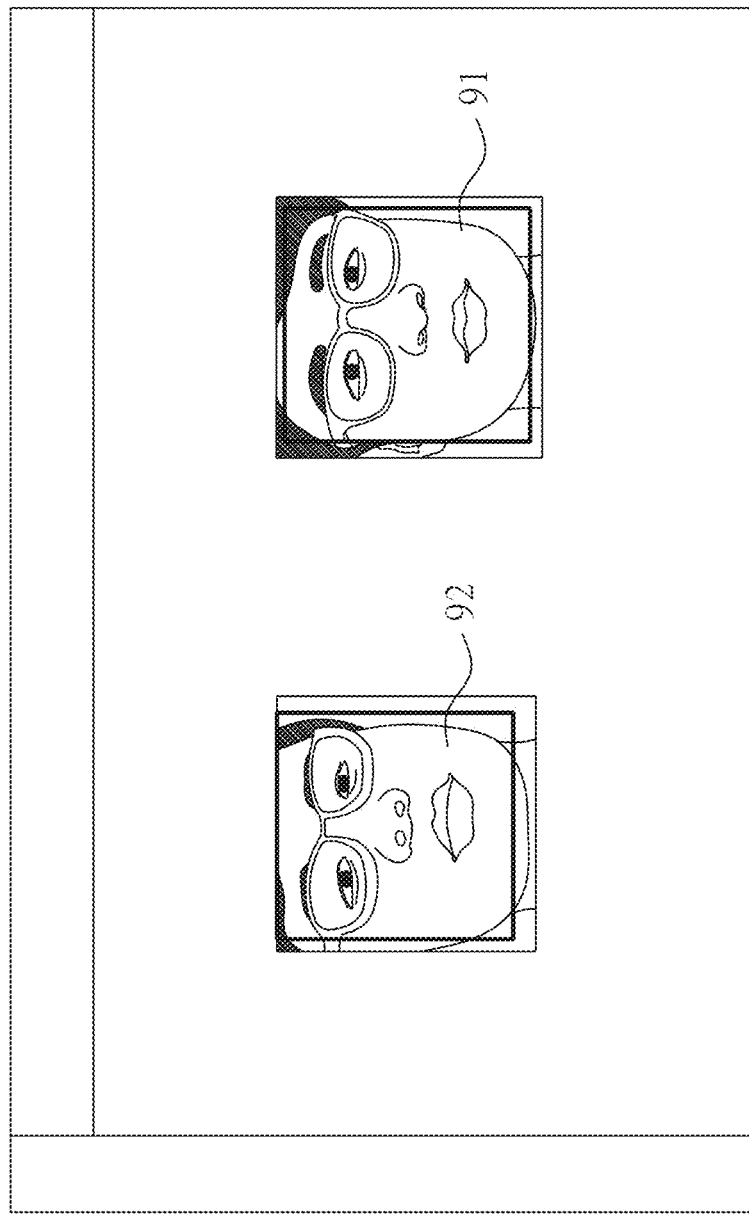
FIG. 1 is a schematic diagram showing similar faces comparison in the prior art.
Figure 2:
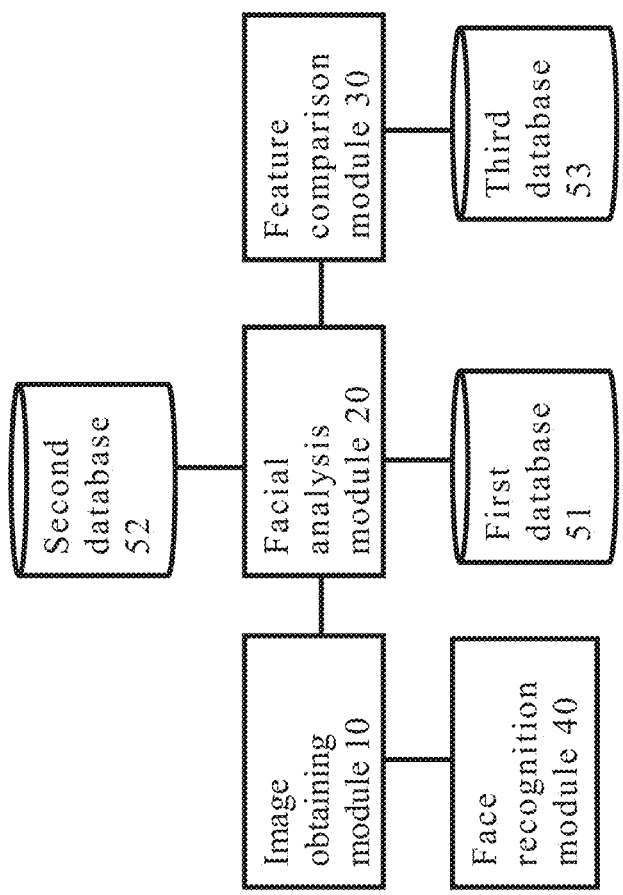
FIG. 2 is a system architecture diagram of a face recognition system of the present invention.

Hereafter, please first refer to FIG. 2 for a system architecture diagram of a face recognition system of the present invention.

In an embodiment of the present invention, a face recognition system 1 has the function of establishing face recognition data and identifying faces, and can be a hardware device, software combined with hardware, firmware with hardware and other combinations. For example, it may be provided on a desktop, laptop or tablet computer, etc., or a computer program product stored in a memory module (not shown) that can be used to achieve the purpose of the present invention, but the present invention is not limited thereto. The face recognition system 1 includes an image obtaining device 10, a facial analysis module 20, a feature comparison module 30, a face recognition module 40, a first database 51, a second database 52, and a third database 53. The above modules are electrically connected to each other. The facial analysis module 20, the feature comparison module 30 and the face recognition module 4 can be a hardware device, firmware, or a combination thereof, or can be achieved by a computer program product computer stored in a computer-readable medium, or a combination of a hardware device and computer program, but the present invention is not limited thereto. The image obtaining device 10 is used to receive external images. The external image can be captured by a camera, a video camera or a smart phone, or directly receive the file of the image, but the present invention does not limit the method or type of images. Therefore, in the process of establishing face recognition data, first, the image obtaining device 10 must first receive a registered facial image.

The facial analysis module 20 is electrically connected to the image obtaining device 10. The facial analysis module 20 is used to analyze the received registered facial image, identify the features in the face, and obtain a registered facial feature. For example, the facial analysis module 20 can obtain different facial areas based on the facial feature of the registered facial image, and then calculate the feature value of the facial feature such as eye parts, nose parts, and mouth part, but the present invention is not limited to finding facial features only in this way. The feature comparison module 30 is electrically connected to the facial analysis module 20 for comparing each feature in one face with a feature of the other face. The face recognition module 40 is electrically connected to the image obtaining device 10 and the facial analysis module 20 for processing the captured image obtained by the image obtaining device 10 to identify the facial image in the captured image and then analyze it through the facial analysis module 20.

The first database 51 and the second database 52 store a plurality of facial images that have been established in advance. The facial images can be a large number of facial images collected from various places (such as the Internet), and the facial images stored in the first database 51 can also include similar facial images or facial images that have been falsely reported. For example, the face recognition system 1 can first use the image obtaining device 10 to receive the facial images, and the feature comparison module 30 compares the facial images with each other to find the similar facial images, so as to store the similar facial images in the first database 51. The preferred number of facial images stored in the first database 51 and the second database 52 is more than 100,000 each, but the collection method and number are not limited thereto. It should be noted that if the number of facial images established by the first database 51 and the second database 52 is not enough, the first database 51 and the second database 52 can also be integrated into a single database. The feature comparison module 30 compares the registered facial feature with the facial feature of the facial images stored in the first database 51 to confirm whether it exceeds a similarity threshold. The feature comparison module 30 performs comparisons by using a technique such as cosine similarity or Euclidean distance, but the present invention is not limited thereto. The similarity threshold is generally used to identify the similarity threshold value, which is also a threshold value that is repeatedly tested to find the highest accuracy rate, e.g. it can be 0.6, but the present invention is not limited to the value.

If the registered facial feature and the facial images stored in the first database 51 are compared and exceeded a similarity threshold, it means that the registered facial image has a certain degree of similarity with other faces, which is likely to be mistaken for other people, hereinafter referred to as similar facial images. Accordingly, the facial analysis module 20 determines the similar facial image corresponding to a feature value exceeding the similarity threshold as a false-positive facial image, and registers its feature as a false-positive facial image feature to be stored in the third database 53. At the same time, the facial analysis module 20 also uses the second database 52 to find the threshold corresponding to the false-positive facial image feature that has been stored in the third database 53 according to the preset false alarm rate. The false alarm rate can be set as one thousandth, but the present invention is not limited to the value. The calculation method of the threshold value can increase the threshold value from 0.01 to 0.99, increasing by 0.01 each time, and use the second database 52 to find the threshold value that can meet the false alarm rate, but the present invention is not limited thereto. Consequently, it is set as a false-positive threshold of the false-positive facial image feature and stored in the second database 52. For example, when knowing that there are three false-positive facial images, the facial analysis module 20 calculates three false-positive facial image features and uses the second database 52 to find the threshold when the false alarm rate can be met. For example, the false-positive thresholds of the three false-positive facial image features that can meet the false alarm rate are 0.55, 0.62, and 0.67, respectively. It should be noted that different registered faces may not have or have different numbers of false-positive faces.

Then, the facial analysis module 20 can further determine a feature threshold of the registered facial feature, and then store it in the third database 53. In an embodiment of the present, the facial analysis module 20 uses the second database 52 to sequentially test the threshold value from 0.01 to 0.99 according to the registered facial feature to find the threshold that meets the false alarm rate, which is to be set as the feature threshold. For example, the feature threshold can be 0.58, and the false alarm rate can be one thousandth, but the present invention is not limited to the values. Moreover, the false alarm rates used for corresponding to the threshold corresponding to the false-positive facial image feature and the feature threshold can be the same or different, but in this embodiment they are all used as one thousandth. In this way, the face recognition system 1 can be configured to complete the establishment of face recognition data.

It should be noted that each module in the face recognition system 1 may be configured as a hardware device, software program in combination with hardware device, or firmware in combination with hardware device. For example, a computer program product can be stored in a computer-readable medium to achieve the function of the present invention, but the present invention is not limited in the manner described above. Additionally, the preferred embodiment of the present invention described here is only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

Figure 3:
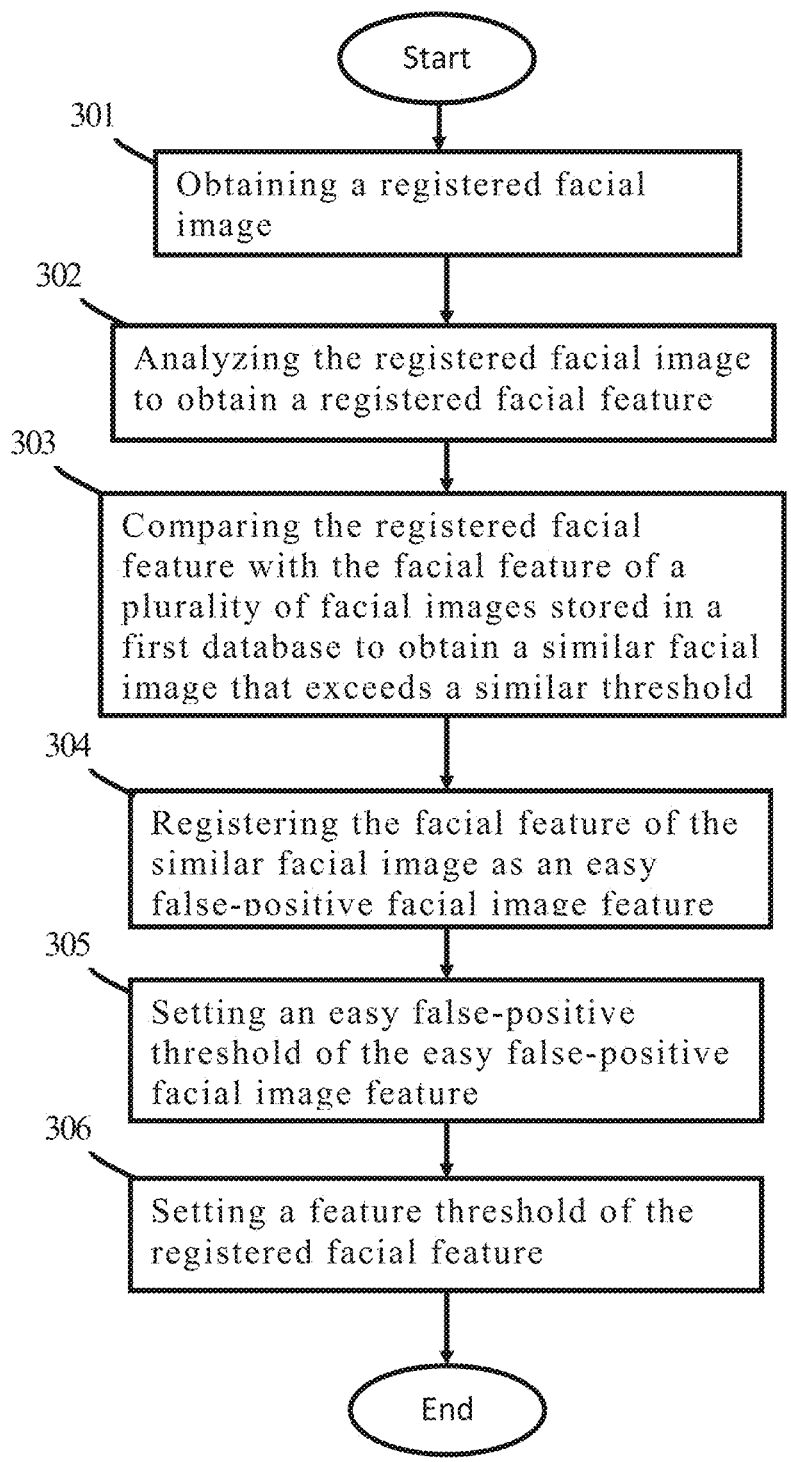
FIG. 3 is a flowchart showing steps in a method for establishing data of face recognition of the present invention.

Then, please refer to FIG. 3 for a flowchart showing steps in a method for establishing data of face recognition of the present invention. It should be noted here that although the above-mentioned face recognition system 1 is taken as an example to explain the threshold value establishment and face recognizing method of the present invention, the threshold establishment and face recognizing method of the present invention are not limited to the face recognition system 1 used in the same structure as above.

First, in Step 301: Obtaining a registered facial image.

The image obtaining device 10 first receives an external image to obtain a registered facial image.

Next, in Step 302: Analyzing the registered facial image to obtain a registered facial feature.

The facial analysis module 20 is then used to analyze the received registered facial image, find out the features in the face, and obtain a registered facial feature.

Then, in Step 303: Comparing the registered facial feature with the facial feature of a plurality of facial images stored in a first database to obtain a similar facial image that exceeds a similarity threshold.

The feature comparison module 30 then compares the registered facial feature with the facial feature of the facial images stored in the first database 51 to confirm whether it exceeds a similarity threshold. The facial images stored in the first database 51 can include similar facial images or facial images that have been falsely reported. For example, the face recognition system 1 can first use the image obtaining device 10 to receive the facial images, and the feature comparison module 30 compares the facial images with each other to find the similar facial images, but the present invention is not limited to the setting method. At this time, the feature comparison module 30 finds the facial images from the plurality of similar facial images stored in the first database 51 that are similar to the registered facial feature. The similarity threshold can be 0.6, but the present invention is not limited to the value.

Then, in Step 304: Registering the facial feature of the similar facial image as a false-positive facial image feature.

If there is a similar facial image corresponding to one that exceeds the similarity threshold, it means that the registered facial image has a certain degree of similarity with other faces in the first database 51. Therefore, the facial analysis module 20 determines the similar facial image in the first database 51 that exceeds the similarity threshold as a false-positive facial image, and identifies its feature to register as the false-positive facial image feature. If there is no one that exceeds the similarity threshold, it is not necessary to further establish the false-positive facial image feature.

Then, in Step 305: Setting a false-positive threshold of the false-positive facial image feature.

At this time, the facial analysis module 20 uses the second database 52 to find a false-positive threshold of the false-positive facial image feature corresponding to the false alarm rate according to the false alarm rate. The false alarm rate can be one thousandth. An algorithm to find the threshold is that the value of the threshold is from 0.01 to 0.99, and each time it is increased by 0.01. When finding a threshold that can meet the false alarm rate, it is the false-positive threshold. But the present invention is not limited thereto.

At last, in Step 306: Setting a feature threshold of the registered facial feature.

The facial analysis module 20 uses the second database 52, according to the false alarm rate and the registered facial feature obtained in Step 302, to set a feature threshold corresponding to the registered facial feature which meets the false alarm rate. Similar to Step 305, the facial analysis module 20 sets the threshold value from 0.01 to 0.99, each time increased by 0.01, to find the threshold when the registered facial feature meets the false alarm rate, but the present invention is not limited to the method. Finally, the third database 53 is used to store the registered facial feature, the false-positive facial image feature, the false-positive threshold, and the feature threshold. Since different registered faces may not have or have different numbers of false-positive faces, each facial image to be registered has to go through the above-mentioned data establishing process to confirm whether each of the registered facial features has its corresponding false-positive facial image and false-positive threshold.

In another embodiment of the present invention, the face recognition system 1 can perform face recognition. When the face recognition system 1 is to perform the face recognition process, the image obtaining device 10 first obtains a captured image, and the face recognition module 40 performs an image processing on the captured image to identify a captured facial image. For example, a user first performs the first binarization on the captured image to separate the foreground and background in the video to obtain a binarized image, and then overlap plurality binarized images to find the position of the face. Accordingly, the face recognition module 40 can find the region of interest (ROI), that is, the captured facial image in the dynamic image. However, the present invention is not limited to the above process. The facial analysis module 20 can analyze a captured facial feature based on the captured facial image. Then, the feature comparison module 30 reads the third database 53 and compares the captured facial feature with the registered facial feature stored in the third database 53 to obtain a first similarity. The feature comparison module 30 confirms whether the first similarity is greater than the feature threshold (such as 0.58 described above), that is, determines whether the captured facial feature is similar to the registered facial feature. If it is greater than the feature threshold, it means that the captured facial feature is similar to the registered facial feature. The feature comparison module 30 further reads the false-positive facial image in the third database 53 and compares the captured facial feature with the false-positive facial image feature stored in the third database 53 to obtain a second similarity. The feature comparison module 30 then confirms whether the second similarity is less than the false-positive threshold, that is, confirms whether the captured facial feature may be a false-positive facial image. For example, if the second similarity is less than any of the thresholds of 0.55, 0.62, and 0.67 described above, the feature comparison module 30 confirms whether it may be similar to the three false-positive facial images.

If the first similarity is less than the feature threshold, it means that the captured facial feature is not similar to the registered facial feature. Therefore, the feature comparison module 30 identifies the captured facial image as an unregistered person. If the first similarity is greater than or equal to the feature threshold, and the second similarity comparison result is less than the false-positive threshold, the captured facial image is a registered facial feature, but it is not a false-positive facial image. Therefore, the feature comparison module 30 identifies the captured facial image as a registered person. Or when the first similarity is greater than or equal to the feature threshold, the second similarity is greater than or equal to the false-positive threshold, and the second similarity is greater than or equal to the first similarity, it means that although it is similar to the registered facial feature, the captured facial image is more similar to the false-positive facial image. Therefore, the feature comparison module 30 identifies the captured facial image as an unregistered person. Finally, when the first similarity is greater than or equal to the feature threshold and the second similarity is greater than or equal to the false-positive threshold, but the second similarity is less than the first similarity, it means that the captured facial image is similar to the registered facial feature, and it is less similar to the false-positive facial image. Therefore, the feature comparison module 30 identifies the captured facial image as a registered person.

Figure 4A:
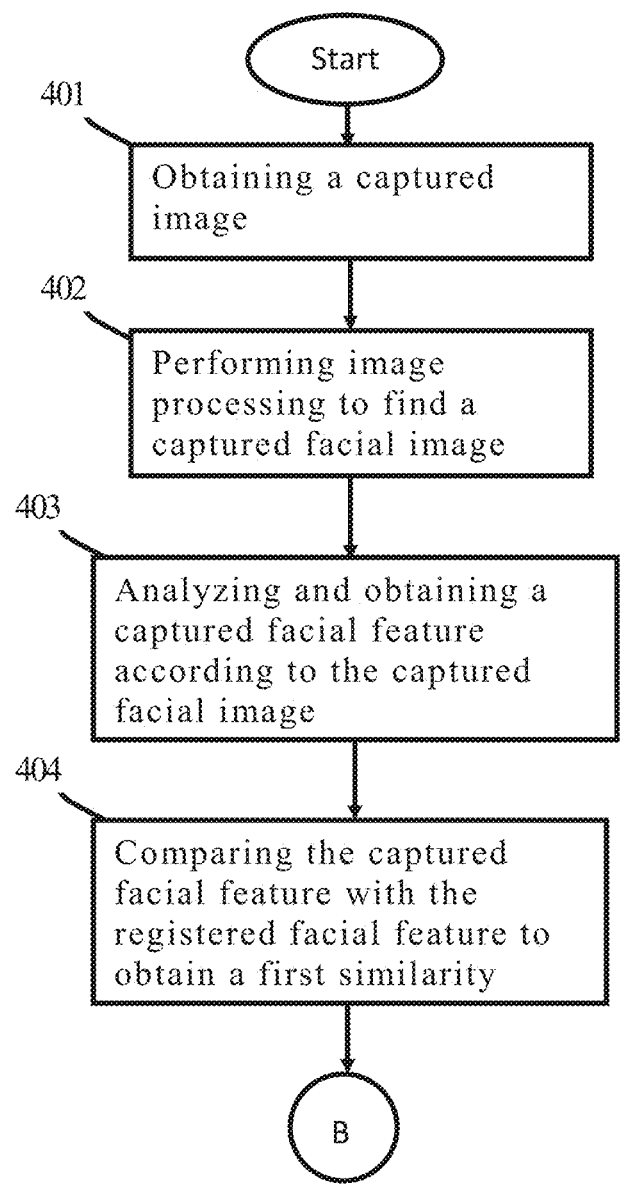
FIGS. 4A-4B are flowcharts showing steps in a face recognizing method of the present invention.
Figure 4B:
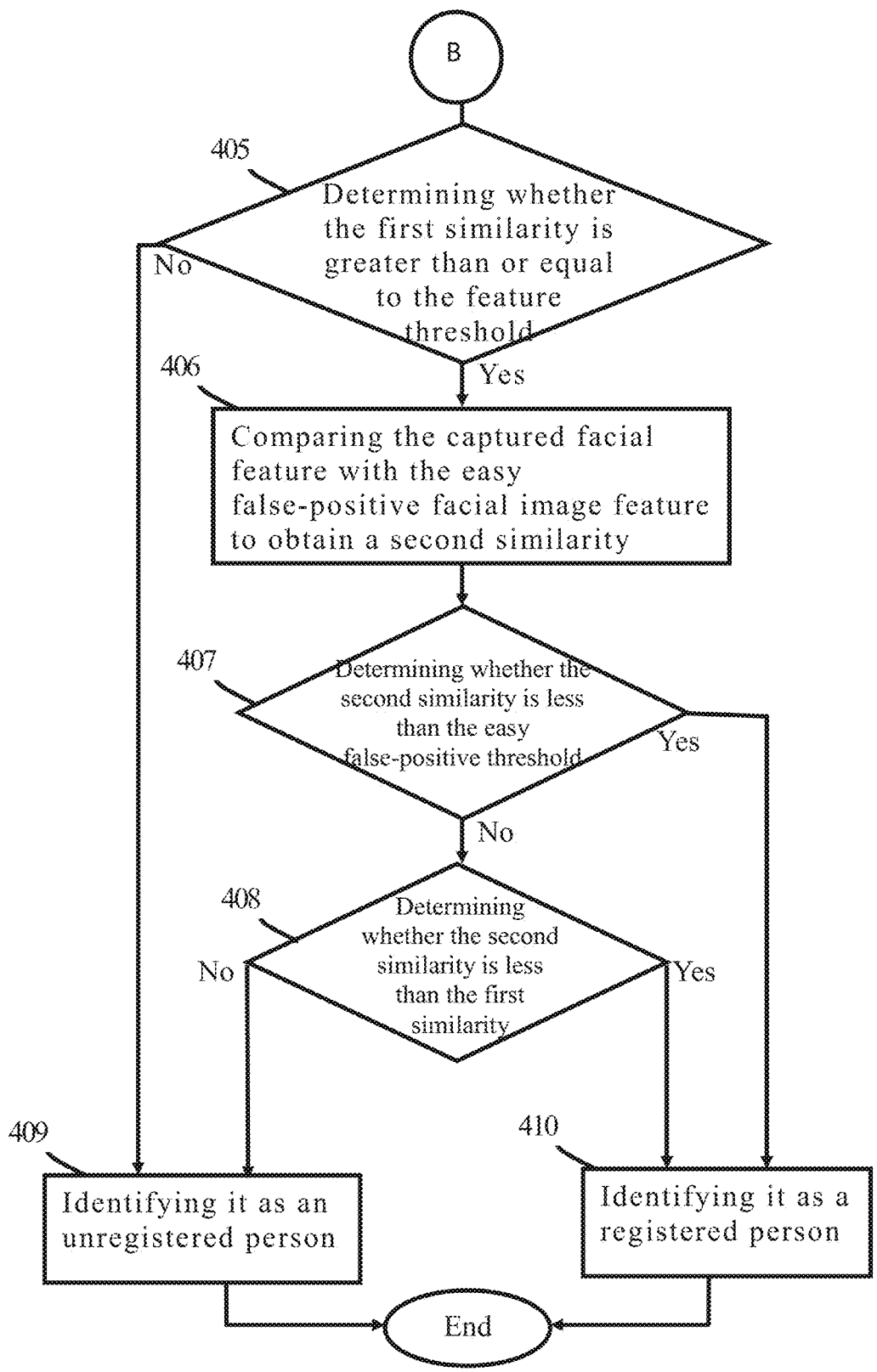

Hereafter, please refer to FIGS. 4A-4B for flowcharts showing steps in a face recognizing method of the present invention.

First, in Step 401: Obtaining a captured image.

The image obtaining device 10 first receives an external image to obtain a captured image.

Next, in Step 402: Performing image processing to find a captured facial image.

The face recognition module 40 then performs image processing on the captured image to find a captured facial image.

Next, in Step 403: Analyzing and obtaining a captured facial feature according to the captured facial image.

The facial analysis module 20 can then analyze and obtain a captured facial feature according to the captured facial image.

Then, in Step 404: Comparing the captured facial feature with the registered facial feature to obtain a first similarity.

The feature comparison module 30 is then used to read the third database 53, and compare the captured facial feature with all the registered facial feature stored in the third database 53 to obtain a first similarity. Since each registered facial feature has its feature threshold, in Step 404, the captured facial feature is compared with the plurality of registered facial features.

Then, in Step 405: Determining whether the first similarity is greater than or equal to the feature threshold.

The feature comparison module 30 confirms whether the first similarity between the captured facial feature and the registered facial feature is greater than or equal to the feature threshold. This can determine whether the captured facial feature is similar to the registered facial feature in the third database 53.

If it is confirmed that the first similarity is greater than or equal to the feature threshold after the comparison, then proceed to Step 406: Comparing the captured facial feature with the false-positive facial image feature to obtain a second similarity.

After the captured facial feature compared with all the registered facial feature, if any of the first similarity is greater than the feature threshold , for example, the first similarity between captured facial feature and registered facial feature is 0.66, greater than the feature threshold 0.58, then it is confirmed that the captured facial feature is similar to the registered facial feature. Furthermore, the feature comparison module 30 reads the third database 53 to correspond to the false-positive facial image of the registered face, so as to compare the captured facial feature with the false-positive facial image feature stored in the third database 53 to obtain a second similarity. In Step 304, if the three false-positive facial images corresponding to the registered facial feature are identified, in Step 405, the feature comparison module 30 will compare the captured facial feature with the three false-positive facial images, that is, will obtain three second similarity.

Then, in Step 407: Determining whether the second similarity is less than the false-positive threshold.

The feature comparison module 30 confirms whether the second similarity is less than the false-positive threshold to confirm whether the captured facial feature is a false-positive facial image.

In the determination of Step 407, if any of the second similarity is greater than or equal to the false-positive threshold (e.g. 0.55, 0.62 and 0.67 described above), proceed to Step 408: Determining whether the second similarity is less than the first similarity.

After comparison, when the captured facial feature is greater than or equal to the false-positive threshold of any false-positive facial image, it means that the captured facial feature is similar to at least one of false-positive facial image, but it may also be a registered facial feature. Therefore, it is necessary to further determine whether it is a registered facial feature.

In the determination of Step 405, if all the first similarity of the facial features are less than the feature threshold, proceed to Step 409: Identifying it as an unregistered person.

After the captured facial feature is compared with all the registered facial features, if the first similarity is not greater than each feature threshold of the registered facial features, it means that the captured facial feature is not similar to all the registered facial features. Therefore, the feature comparison module 30 directly identifies the captured facial image as an unregistered person, that is, a stranger. In addition, when any of the second similarity in the determination of Step 407 is greater than or equal to the false-positive threshold, but the second similarity in the determination of Step 408 is greater than or equal to the first similarity, it means that the captured facial image is similar to the false-positive facial image, and the captured facial image is more similar to the false-positive facial image than the registered facial feature. Therefore, the feature comparison module 30 identifies the captured facial image as an unregistered person.

In the determination of Step 407, if the comparison result between the captured facial feature and all the false-positive facial images is less than the false-positive threshold, proceed to Step 410: Identifying it as a registered person.

When the second similarity of the captured facial feature and all the false-positive facial images is less than the respective false-positive threshold, it means that the captured facial feature is not similar to all the false-positive facial images. This means that the captured facial image is a registered facial feature, but it is not a false-positive facial image. Therefore, the feature comparison module 30 identifies the captured facial image as a registered person.

Finally, in the determination of Step 407, if any second similarity is greater than or equal to the false-positive threshold, but the second similarity is less than the first similarity in the determination of Step 408, it means that the captured facial image is similar to the false-positive facial image, but the captured facial image is less similar to the false-positive facial image than the registered facial feature. Therefore, the feature comparison module 30 finally identifies the captured facial image as a registered person.

It should be noted here that the method for establishing data of face recognition and face recognizing method of the present invention is not limited to the above sequence of steps. As long as the purpose of the present invention can be achieved, the order of the above steps can also be changed.

In this way, when face recognition system 1 recognizes a face, in addition to confirming whether the face data is stored, it can also determine whether it is a false-positive facial image, so the accuracy of face recognition can be greatly increased.

It should be noted that the embodiments of the present invention described above are only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

What is claimed is:

1. A method for establishing data of face recognition, used for a face recognition system, the method comprising the steps of:
   obtaining a registered facial image;
   analyzing the registered facial image to obtain a registered facial feature;
   comparing the registered facial features with facial features of plurality facial images stored in a first database to obtain a similar facial image from the plurality facial images that exceeds a similarity threshold;
   registering a facial feature of the similar facial image as a false-positive facial image feature;
   using a second database to find a corresponding threshold when the false-positive facial image feature meets a false alarm rate and set it as a false-positive threshold of the false-positive facial image feature; and
   using the second database to find the corresponding threshold when the registered face image matches the false-positive rate and set it as a feature threshold of the registered facial feature.

2. The method for establishing data of face recognition as claimed in claim 1, further comprising the step of setting the false alarm rate as one thousandth.

3. A face recognizing method, using a face recognition data, the face recognition data comprising a registered facial feature and a false-positive facial image feature, the method comprising the following steps:
   obtaining a captured image;
   performing image processing to find a captured facial image;
   obtaining a captured facial feature by analyzing the captured facial image;
   comparing the captured facial feature with the registered facial feature to obtain a first similarity;
   determining whether the first similarity is greater than or equal to a feature threshold, wherein the feature threshold is set as the corresponding threshold when the registered face image matches the false-positive rate;
   if the first similarity is less than the feature threshold, it is identified as an unregistered person;
   if the first similarity is greater than or equal to the feature threshold, comparing the captured facial feature with the false-positive facial image feature to obtain a second similarity;
   determining whether the second similarity is less than a false-positive threshold, wherein the false-positive threshold is set as a corresponding threshold when the false-positive facial image feature meets a false alarm rate; and
   if the second similarity is less than the false-positive threshold, identifying the captured image as a registered person.

4. The face recognizing method as claimed in claim 3, further comprising the following step: if the second similarity is greater than or equal to the false-positive threshold and the second similarity is less than the first similarity, it is identified as the registered person.

5. The face recognizing method as claimed in claim 3, further comprising the following step: if the second similarity is greater than or equal to the false-positive threshold and the second similarity is greater than or equal to the first similarity, it is identified as the unregistered person.

6. A face recognition system, comprising:
   an image obtaining device, used for obtaining a registered facial image;
   a facial analysis module, electrically connected to the image obtaining device for analyzing the registered facial image to obtain a registered facial feature and set a feature threshold for the registered facial feature;
   a first database, used for storing a plurality of facial images;
   a feature comparison module, electrically connected to the first database for comparing the registered facial feature with the facial feature of the plural facial images stored in the first database to register a facial feature of a similar facial image from the plurality facial images corresponding to more than a similarity threshold as a false-positive facial image feature; such that the facial analysis module determines a false-positive threshold of the false-positive facial image feature; and
   a second database, used for storing a plurality of facial images for the facial analysis module to determine a threshold when the false-positive facial image feature meets the false alarm rate as the false-positive threshold and allowing the facial analysis module to determine the corresponding threshold as the feature threshold when the registered facial image meets the false alarm rate.

7. The face recognition system as claimed in claim 6, wherein the false alarm rate is one thousandth.

8. The face recognition system as claimed in claim 6, further comprising a third database for storing the registered facial feature, the false-positive facial image feature, the false-positive threshold, and the feature threshold.

9. The face recognition system as claimed in claim 8, further comprising a face recognition module, wherein after the image obtaining device obtains a captured image, the face recognition module performs image processing to find a captured facial image, so as to obtain a captured facial feature according to the captured facial image analysis;
   thereby, the feature comparison module is used to read the third database to compare the extracted facial features with the registered facial feature to obtain a first similarity; if the first similarity is less than the feature threshold, the feature comparison module recognizes that the captured facial image is an unregistered person; if the first similarity is greater than or equal to the feature threshold, the feature comparison module reads the third database to compare the captured facial feature with the false-positive facial image feature to obtain a second similarity; if the second similarity is less than the false-positive threshold, the feature comparison module recognizes that the captured facial image is a registered person.

10. The face recognition system as claimed in claim 9, wherein if the second similarity is greater than or equal to the false-positive threshold and less than the first similarity, the feature comparison module identifies the captured facial image as the registered person.

11. The face recognition system as claimed in claim 9, wherein if the second similarity is greater than or equal to the false-positive threshold and greater than or equal to the first similarity, the feature comparison module identifies the captured facial image as the unregistered person.

* * * * *